United States Patent [19]
Kobayashi

[11] Patent Number: 5,317,668
[45] Date of Patent: May 31, 1994

[54] MOTOR CONTROL DEVICE FOR CONTROLLING MOTOR SPEED DEPENDING ON IMPARTED LOAD

[75] Inventor: Norio Kobayashi, Nagoya, Japan

[73] Assignee: Brother Kogyo Kabushiki Kaisha, Aichi, Japan

[21] Appl. No.: 895,098

[22] Filed: Jun. 8, 1992

[30] Foreign Application Priority Data

Jun. 19, 1991 [JP] Japan .................. 3-147524

[51] Int. Cl.$^5$ .............................. H02P 5/17
[52] U.S. Cl. .................... 388/811; 388/815; 388/902; 388/904; 388/907.5; 400/144.2
[58] Field of Search ............... 388/809–815, 388/819, 902, 907.5, 904; 400/903, 902, 185, 139, 144, 144.1, 144.2; 318/561, 590–594

[56] References Cited

U.S. PATENT DOCUMENTS

| | | | |
|---|---|---|---|
| 4,270,868 | 6/1981 | Morgan et al. | 388/811 X |
| 4,486,693 | 12/1984 | Hamati et al. | 318/561 |
| 4,523,137 | 6/1985 | Wong | 318/604 |
| 4,689,528 | 7/1987 | Watanabe | 318/594 |
| 4,802,777 | 2/1989 | Yamada | 318/594 X |
| 5,089,761 | 2/1992 | Nakazawa | 388/811 X |
| 5,220,266 | 6/1993 | Kobayashi | 388/902 X |

*Primary Examiner*—William M. Shoop, Jr.
*Assistant Examiner*—David Martin
*Attorney, Agent, or Firm*—Kane, Dalsimer, Sullivan, Kurucz, Levy, Eisele and Richard

[57] ABSTRACT

For operating a plurality of mechanisms with a single motor, a motor control device is provided which is capable of stably operating one of the mechanisms while reducing influence of load imparted on the motor and attributed by an operation of remaining one of the mechanisms. A CPU suitably controls or selects electrical current level provisionally ranked and stored in a ROM to a printing motor which drives a print hammer for obtaining predetermined velocity of the hammer. If the print hammer reaches its decelerating position, the CPU determines offset electrical current level and current applying period to be applied to the printing motor on a basis of the rank of the electrical current at that phase.

13 Claims, 5 Drawing Sheets

MOTOR CONTROL DEVICE FOR CONTROLLING MOTOR SPEED DEPENDING ON IMPARTED LOAD

BACKGROUND OF THE INVENTION

The present invention relates to a motor control device, and more particularly, to the control device for controlling rotation speed of the motor depending on load level imparted thereon.

Has been known a conventional equipment using a motor as a drive source, for example, a printing device which employs a motor for printing operation. As one example of this type of the printing device, has been known a daisy wheel type electronic typewriter in which a print hammer, a character wheel, a printing ribbon and an erase ribbon are provided on a carriage for performing character printing and erasing.

SUMMARY OF THE INVENTION

The present inventor has already made an inhouse proposal for providing an improved electronic typewriter in which production cost can be lowered and a carriage has a compact size. The typewriter is provided with a single motor mounted on the carriage for driving various mechanisms such as a position shifting mechanism for shifting a position of a holder member between a printing position and an erase position, the holder mounting thereon the printing ribbon and the erase ribbon, a print hammer drive mechanism for impacting the character wheel with the print hammer, a printing ribbon takeup mechanism for taking up the printing ribbon in accordance with a printing operation, and an erase ribbon takeup mechanism for taking up the erase ribbon in accordance with an erasing operation.

According to the proposed electronic typewriter, driving force of the motor is transmitted to the print hammer through the print hammer driving mechanism in case of printing operation by way of the print hammer. By the driving force, the print hammer is moved at high speed for providing impacting force against the character wheel.

In case of driving the print hammer, it is necessary for the print hammer to impact on the character wheel with a predetermined pressure in order to obtain a constant printing quality. To this effect, an encoder and a computer are used for detecting position and velocity of the print hammer in order to control the velocity of the print hammer in accordance with the detected data.

For executing the speed control, large forward current is applied to the motor for moving the print hammer from a rest position to a given position at which no significant influence is imparted for printing in order to move the print hammer as fast as possible. On the other hand, if the printing hammer reaches the given position, offset current is applied to the motor for decelerating the moving speed of the print hammer. As a result, the print hammer is controlled to have a constant printing pressure when impacting onto the character wheel.

However, in case where the print hammer and other mechanisms are driven by the single motor, for example, if the movement of the print hammer is performed concurrently with the printing ribbon takeup operation, desirable speed control to the print hammer may not be carried out.

For example, the printing ribbon take-up load may be changed depending on the takeup amount of the ribbon. Therefore, intended deceleration of the print hammer may not be carried out even by attempting to provide a constant offset current to be applied to the motor for the purpose of obtaining a predetermined printing pressure with the intended deceleration of the hammer. Therefore, time period reaching the predetermined printing pressure may be varied, to thereby provide instable printing pressure. Thus, high quality printing may not be achievable.

The present invention has been established to overcome the above described drawbacks, and it is an object of the present invention to provide a motor control device capable of providing a stable operation of one of the mechanisms by reducing influence of load attributed to the operation of remaining one of the mechanisms in a case where the single motor operates a plurality of mechanisms.

This and other object of the invention will be attained by providing a motor control device for controlling rotation of a motor comprising (a) detection means for detecting an actual rotation condition of the motor, (b) load assumption means for assuming a level of load imparted on the motor on a basis of the actual rotation condition detected by the detection means, and (c) offset current setting means for setting at least one of offset current level and offset current applying period on a basis of an assumed load level.

According to the motor control device of the present invention, rotation speed of the motor is controlled by changing electrical current applied to the motor. The detection means detects actual rotation condition of the motor, and the load assumption means assumes the level of the load imparted on the motor based on the detected actual rotation condition of the motor. Further, the offset current setting means sets at least one of the level of the offset current and period for applying the offset current to the motor based on the load exerted on the motor and assumed by the load level assumption means. That is, in the present invention, inverse current to be applied to the motor is subjected to control in accordance with the load exerted on the motor.

In another aspect of the invention, there is provided an electronic typewriter comprising a main frame, a single drive motor fixedly secured to the main frame and having a drive shaft, a print hammer drive mechanism, a position shifting mechanism, a printing ribbon takeup mechanism, an erase ribbon takeup mechanism, and means for controlling rotation speed of the single drive motor. The print hammer drive mechanism is driven by the single motor, and comprising a printing cam coupled to the drive shaft, lever means pivotally supported to the main frame and having one end in contact with the printing cam and having another end, and a print hammer pivotally supported to the another end of the lever means. The position shifting mechanism is driven by the single motor and having a holder member and an elevation cam for moving the holder member between a printing position and an erase position. The elevation cam is coupled to the drive shaft. The printing ribbon takeup mechanism is driven by the single motor and having a printing ribbon for taking up the printing ribbon in accordance with a printing operation. The printing ribbon is mounted on the holder member. The printing ribbon takeup mechanism further comprises a ribbon supply cam coupled to the drive shaft, a pivot member having one end in contact with the ribbon supply cam and another end, and a ribbon feed means rotatably supported to the holder and engageable with the another end of the pivot member. The erase ribbon takeup mechanism is driven by the single motor and having an erase ribbon mounted on the holder. The means for controlling rotation speed of the single drive motor controls the rotation speed of the single drive motor depending on a level of load imparted thereon.

DETAILED DESCRIPTION OF THE PREFERRED EMBODIMENTS

A motor control device according to one embodiment of the present invention will next be described with reference to drawings.

The illustrated embodiment pertains to an electronic typewriter in which a single direct current motor serves as a drive source for performing printing operation, printing ribbon takeup operation, erasing operation, and erase ribbon takeup operation. Therefore, load imparted on the motor is varied dependent on the ribbon takeup condition or state. Incidentally, additional motor is used for moving a carriage.

Figure 1:
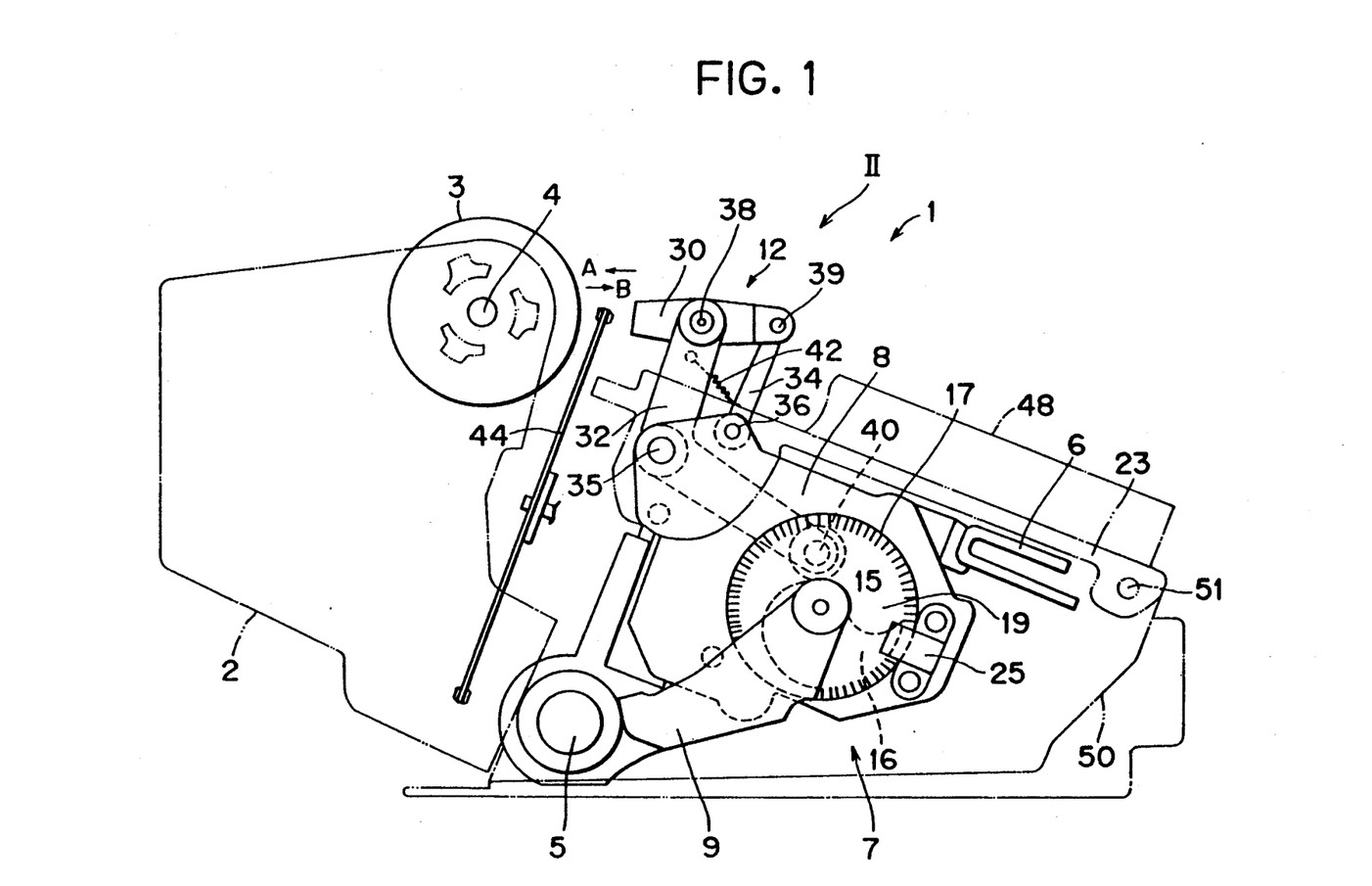
FIG. 1 is a side elevational view showing an internal arrangement of a typewriter according to one embodiment of this invention.
Figure 2:
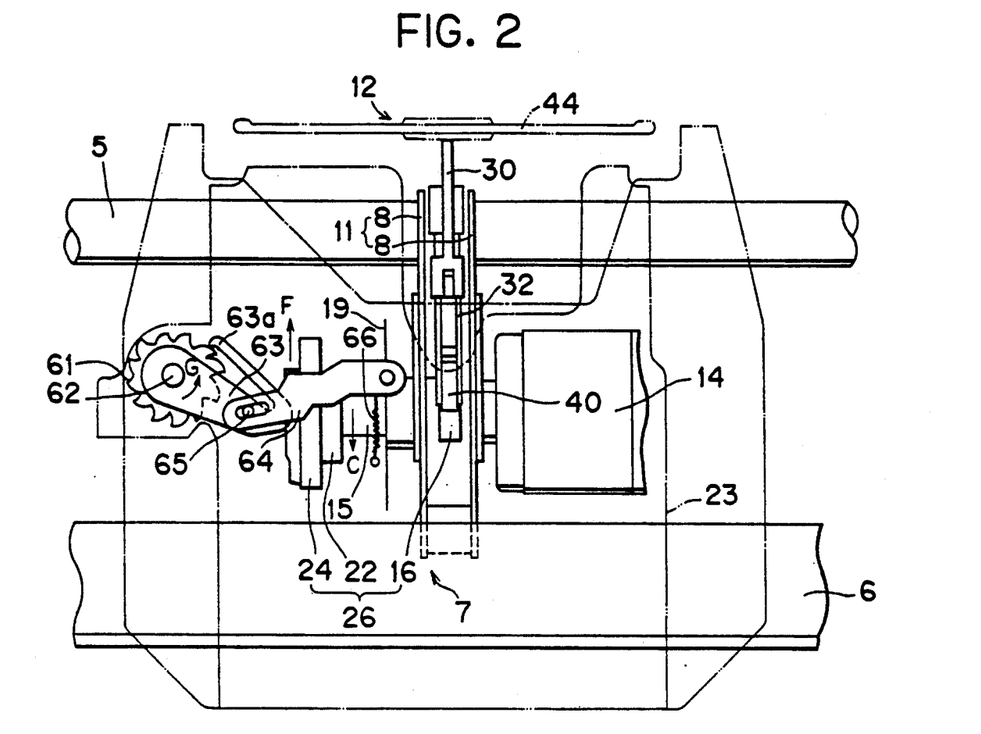
FIG. 2 is a view as viewed from an arrow II of FIG. 1 and showing the internal arrangement of the typewriter according to the embodiment.

As shown in FIGS. 1 and 2, a typewriter 1 has a casing, whose internal sides are provided with side wall plates (machine frame) 2, and a platen 3 is disposed between the pair of side wall plates 2.

The platen 3 has a platen shaft 4 whose both end portions are rotatably supported by the side wall plates 2. A driven gear (not shown) is coupled to one side portion of the platen shaft 4. Through the driven gear, the platen 3 is drivingly rotatable about its axis by a platen drive motor 10 (FIG. 5) and a platen driving mechanism (not shown).

Further, a guide shaft 5 and a guide member 6 having U-shape in cross section extend in parallel with the platen 3 and between the pair of side wall plates 2. A carriage 7 is movably supported by the guide shaft 7 and the guide member 6, the carriage being laterally movable.

The carriage 7 has a main carriage body 11 including a main frame 8 and a support member 9. The main frame 8 has a pair of plate members extending in parallel with each other with a predetermined distance therebetween. On the other hand, the support plate 9 is adapted to movably and rotatably support the pair of main frames 8 to the guide shaft 5. That is, the main frame 8 is laterally movable relative to the guide shaft 5 and rotatable about the guide shaft 5 by virtue of the support member 9. The carriage 7 is reciprocally movable in the lateral direction along the platen 3 by a carriage drive motor 13 (FIG. 5) and a carriage driving mechanism (not shown) through a driving wire (not shown).

Next, a printing mechanism 12 will be described.

A direct current printing motor 14 is fixedly supported on one side of the main frame 8 (right side in FIG. 2). A drive shaft 15 of the printing motor 14 extends through the pair of main frames 8 and protrudes from another side (left side in FIG. 2) of the main frames 8.

To the drive shaft 15, are connected a printing cam 16 having a whirl shape in side elevational view which is positioned between the pair of main frames 8, an encoder disc 19 in which a plurality of slits 17 are formed at an outer peripheral portion thereof, a ribbon supply cam 22 for stepwisely feeding the printing ribbon, and an elevation cam 24 for upwardly moving the holder member 23 to an erase position.

A cam body 26 is constituted by a combination of the printing cam 16, the ribbon supply cam 22 and the elevation cam 24. The ribbon supply cam 22 and the elevation cam 24 are provided integrally with each other as the cam body.

At a position adjacent the encoder disc 19, as shown in FIG. 1, a photosensor 25 is provided having a LED light emitting portion and light receiving portion interposing the slit 17 therebetween. The photosensor 25 is adapted to detect light change passing through the slit 17 of the encoder disc 19. In accordance with the detected information, rotation speed of the printing motor 14 and moving sped of the print hammer 30 can be computed as described later.

Further, between the pair of the main frames 8, a L-shaped pivot lever 32 is disposed. A central portion of the pivot lever 32 is pivotably supported by the main frame by means of a pins 35. Further, a link 34 is provided whose lower end is pivotally supported to the main frame by a pin 36.

Further, an upper end portion of the pivot lever 32 and an upper end portion of the link 34 are pivotally connected to a print hammer 30 by pins 38, 39, respectively. Thus, the print hammer 30 can be moved in directions indicated by arrows A and B by four pivotal connections given by the pins 35, 36, 38 and 39.

On the other hand, a cam follower 40 is rotatably supported to a lower end portion of the pivot lever 32. Further, a tension spring 42 is provided between the upper end portion of the pivot lever 32 and the lower end portion of the link 34 for urging the cam follower 40 to bring into abutment with a cam surface of the printing cam 16.

Further, a daisy wheel 44 is provided between the platen 3 and the print hammer 30. The daisy wheel 44 is drivingly rotatable by a wheel drive motor 46 (FIG. 5) and a wheel driving mechanism (not shown). A ribbon cassette 48 is provided for housing therein a printing ribbon. Further, an auxiliary frame 50 is provided which is laterally movable. The holder member 23 which mounts thereon the ribbon cassette 48 is pivotably supported by the auxiliary frame 50 through a support shaft 51. Thus, the holder member 23 is vertically and pivotally movable about the shaft 51.

Next, will be described the ribbon takeup mechanism 60 for taking up a predetermined length of the print ribbon at every printing operation with reference to FIGS. 2 through 4.

Figure 3:
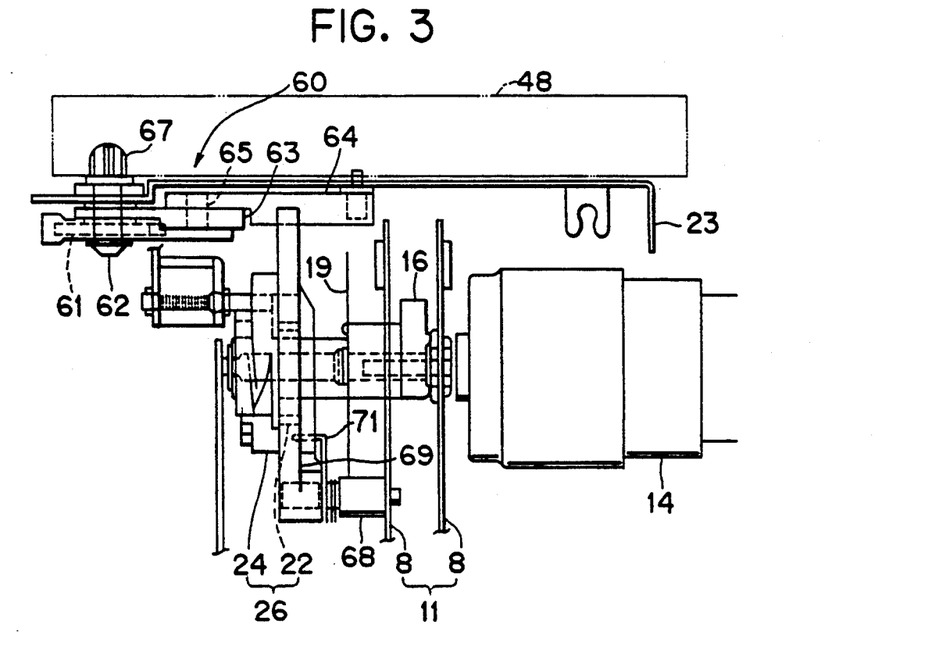
FIG. 3 is a fragmentary front elevational view showing the internal arrangement of the typewriter according to the embodiment.

As shown in FIG. 3, a ratchet 61 having a plurality of teeth is rotatably supported, by a pin 62, to a lower left side portion of the holder member 23. A takeup spool 67 for taking up the printing ribbon is fixed to the pin 62. Further, as shown in FIG. 2, a second pivot member 64 is rotatably supported to the holder member 23, and a third pivot member 63 provided with a feed pawl 63a is rotatably supported to the pin 62. The third pivot member 63 is connected to the second pivot member 64 through a connection pin 65. The second pivot member 64 is biasedly urged in a direction indicated by an arrow C by a tension spring 66.

On the other hand, as shown in FIG. 3, at a position corresponding to the position of the whirl shaped ribbon supply cam 22, a lower end portion of a first pivot member 69 is rotatably supported to a pivot shaft 68 fixedly secured to the left side main frame 8. An upper portion of the first pivot member 69 is abuttable on a neighborhood of a base end portion of the second pivot member 64 from a front side thereof.

Figure 4:
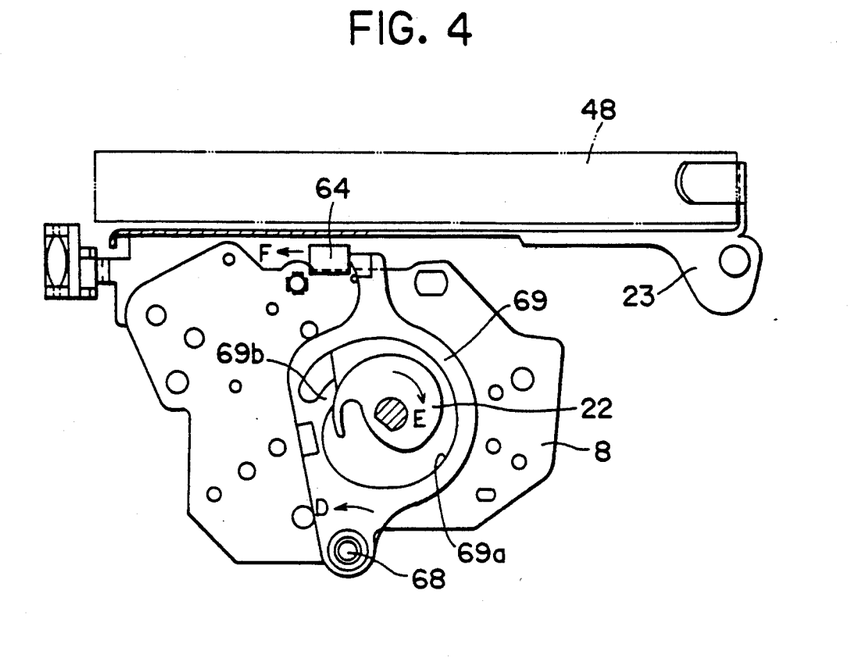
FIG. 4 is a fragmentary side elevational view showing a first pivot member.

Further, as shown in FIG. 4, the first pivot member 69 is formed with a generally circular hole 69a in which the ribbon supply cam 22 is positioned. The first pivot member 69 has a protruding portion 69b to which a part of the ribbon supply cam 22 is always contacted. To this effect, a torsion spring 71 (FIG. 3) is disposed around the pivot shaft 68 for urging the protruding portion 69b in a direction indicated by an arrow E.

Thus, if the printing motor 14 is rotated in the direction indicated by the arrow E, the first pivot member 69 is angularly moved in a direction indicated by arrow D because of the cam shape of the ribbon supply cam 22 through the protruded portion 69b. Therefore, the second pivot member 64 is pivotally moved in a direction indicated by an arrow F. Accordingly, as shown in FIG. 2, the third pivot member 63 is angularly rotated in a direction indicated by an arrow G, so that the ratchet 61 is angularly rotated by one tooth by virtue of the feed pawl 63a. Consequently, the printing ribbon is stepwisely fed by a predetermined amount by the takeup spool 67 immediately before the printing operation.

Next, electronic control unit which controls the above described electronic typewriter will be described.

Figure 5:
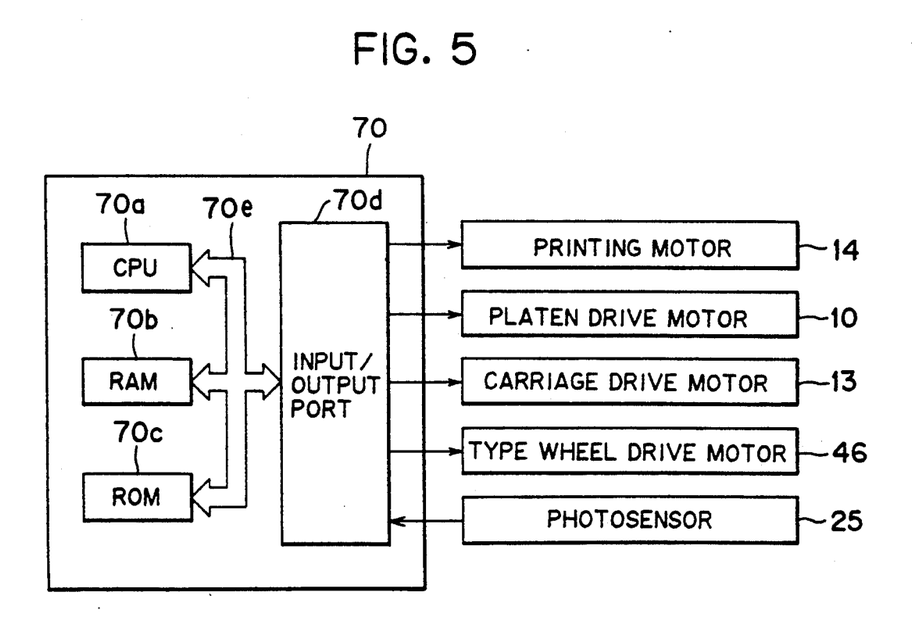
FIG. 5 is a block diagram showing electronic control unit.

As shown in FIG. 5, the electronic control (ECU) 70 includes conventional CPU 70a, RAM 70b, ROM 70c an input/ output port 70d, bus line 70e, etc. To the input/output port, are connected the platen drive motor 10, the carriage drive motor 13, the wheel drive motor 46, and the printing motor 14. Further, the photosensor 25 is connected to the input/output port.

Stored in the ROM 70c, as shown in Table 1 are: a current level to be applied to the printing motor 14 at an operation phase thereof, offset current level to be applied to the motor at deceleration phase of the print hammer 30 on a basis of the current level, a period for applying the inverse current, and categories (ranks) of these current levels. Incidentally, if load applied to the printing motor 14 is high, the high current level is set correspondingly. This is due to the fact that current level must have correspondence with the load, that is, must be proportional to the load in order to provide a predetermined initial speed of the print hammer 30.

TABLE 1

| No. | Current Level | Rank | Offset Current Level | Offset Current Applying Period |
|---|---|---|---|---|
| 1 | 2.5 A | A | 1 A | 3 ms |
| 2. | 2.0 A | | | |
| 3. | 1.5 A | B | 2 A | 5 ms |
| 4. | 1.0 A | | | |
| 5. | 0.5 A | C | 3 A | 5 ms |

As is apparent from the Table 1, if high current level is set, i.e, if load is high, the inverse current level is low, or the inverse current applying period is short. This is due to the fact that the print hammer 30 can be easily decelerated if the load is high. Therefore, newly added energy can be small for the purpose of deceleration. Accordingly, with reference to the current levels, inverse current level in accordance with the load level can be determined.

Next, speed control to the print hammer 30 executed by the electronic control unit 70 will be described with reference to a flowchart shown in FIG. 6, time chart shown in FIG. 7 and an explanatory view shown in FIG. 8 where operation of the print hammer is delineated.

Figure 6:
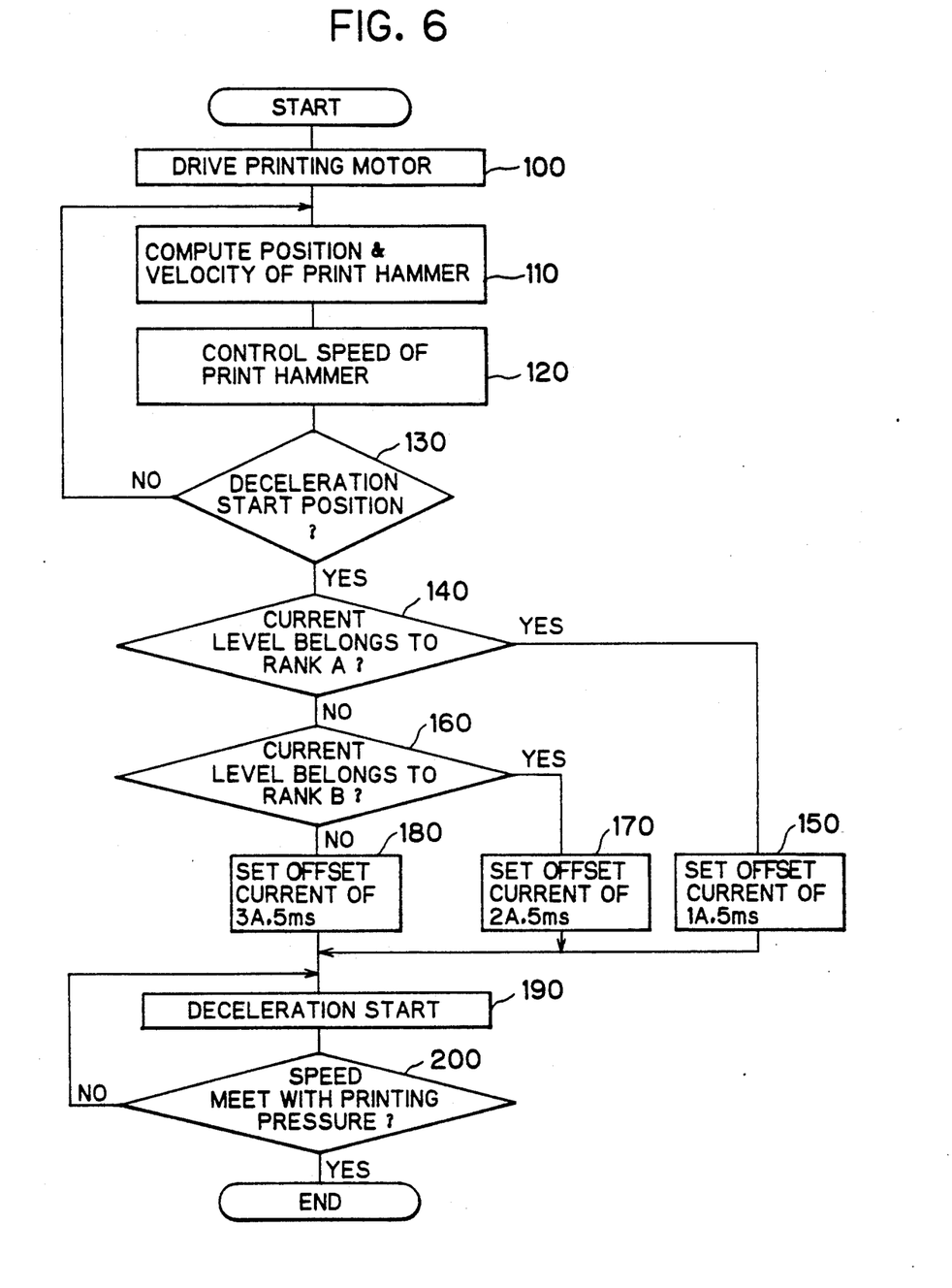
FIG. 6 is a flowchart showing speed control to a print hammer.
Figure 7:
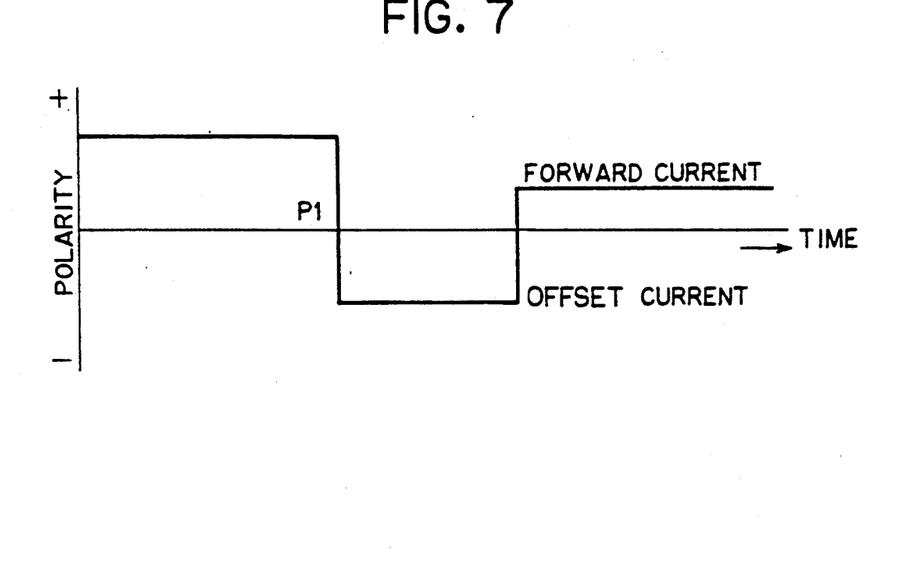
FIG. 7 is a time chart showing electrical current to be applied to a printing motor.
Figure 8:
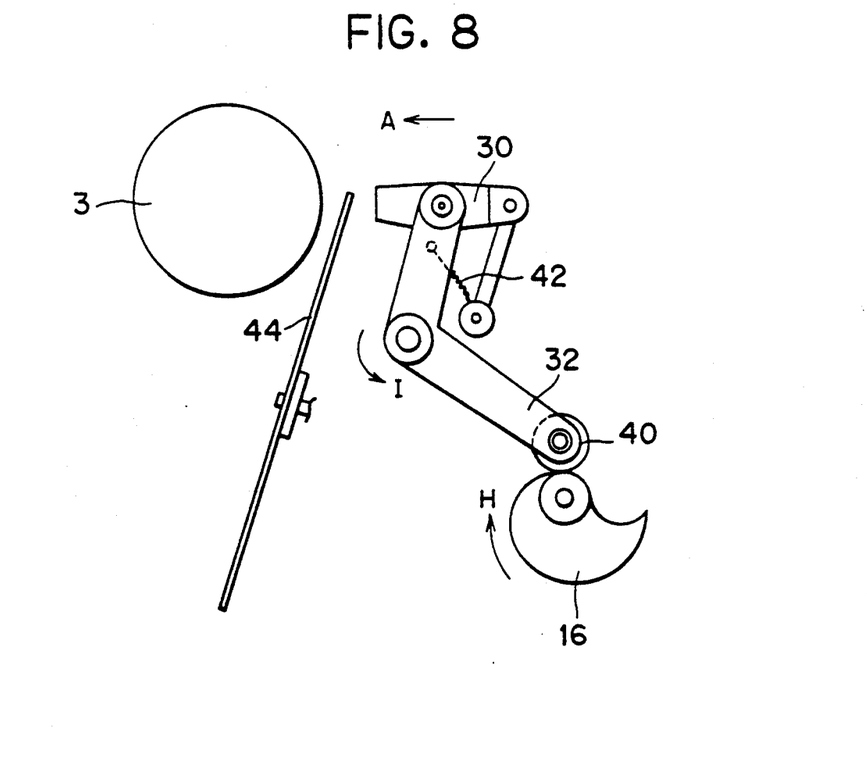
FIG. 8 is an explanatory view for description of operation of the print hammer 1.

First, in Step 100 shown in FIG. 6, the printing motor 14 is energized for rotating the printing cam 16 in a direction indicated by an arrow H as shown in FIG. 8, so that the pivot lever 32 is angularly moved in a direction indicated by an arrow I through the cam follower 40. Therefore, the print hammer 30 is moved in a direction indicated by an arrow A against the biasing force of the spring 42.

If the printing motor 14 is energized, the encoder disc 19 is rotated, so that in Step 110, position and moving velocity of the print hammer 30 is computed based on a pulse signal from the photosensor 25.

Next, in Step 120, on a basis of the speed data obtained in the Step 110, moving velocity of the print hammer 30 is controlled. That is, feed back control is executed such that a width of the pulse signal generated when the photosensor 25 detects the slit of the encoder disc 19 becomes to have a prestored pulse width of, for example, 0.3 ms, which corresponds to the predetermined initially command speed of the motor. In this control, actual rotation speed detected by the photosensor 25 is compared with the predetermined command speed. On a basis of the speed difference between the predetermined command speed and the actual speed, one of the current levels in Table 1 stored in the ROM 70c is selected among Nos. 1 through 5. The selected current is applied to the printing motor 14. In this case, if the large speed difference is provided, that is, if large load is imparted on the printing motor 14, high current level is selected among the Table 1. The selected current level is utilized for the purpose of assuming the level of load imparted on the motor in subsequent Steps 140 and 160.

In Step 130, judgment is made as to whether or not the print hammer 30 is brought to a predetermined deceleration start position P1 (FIG. 7) at which deceleration control to the print hammer 30 is started. If the judgment falls Yes, the routine goes into Step 140.

In the Step 140, judgment is made as to whether or not the current level applied to the printing motor 14 at this instance belongs to the rank A of Table 1, that is, judgment is made as to whether or not high load is exerted on the motor on a basis of the width of the pulse signal transmitted form the photosensor 25. If the judgment falls Yes, the routine goes into Step 150. On the other hand, if the judgment falls No, the routine proceeds into Step 160.

In Step 150, a setting is effected so as to apply 1A of offset current for 3 ms in accordance with the Table 1. In other words, low level offset current is set, since the printing motor 14 can be easily decelerated in the state where high load is applied thereto.

On the other hand, in the Step 150, judgment is made as to whether or not the current level applied to the printing motor 14 at this instance belongs to the rank B of Table 1, that is, judgment is made as to whether or not intermediate scale of load is exerted on the motor, which requires intermediate level of electrical current. If the judgment falls Yes, the routine goes into Step 170. On the other hand, if the judgment falls No, the routine goes into Step 180.

In the Step 170, a setting is effected so as to apply 2A of offset current for 5 ms in accordance with the Table 1. In other words, the offset current having intermediate level is set, since deceleration of the printing motor 14 has an intermediate degree in the state where intermediate load is applied thereto.

On the other hand, in the Step 180, 3A of offset current is applied for 5 ms assuming that the current level applied to the printing motor 14 in this instance belongs to the rank C, that is, with the assumption that the low load is exerted on the motor. In Step 190, the offset current level, the thus set, is flowed for the predetermined period as shown in FIG. 7.

In a subsequent step 200, on a basis of the width of the pulse signal transmitted from the photosensor 25, judgment is made as to whether or not the print hammer 30 reaches a predetermined speed which provides predetermined printing pressure. If the judgment falls No, the routine goes back to the Step 190 fore repeating the same control. If the judgment falls Yes, the control is ended.

As described above, according to the present embodiment, at a phase before the print hammer reaches the deceleration start position (P1 in FIG. 7), load exerted on the printing motor 14 is judged on a basis of the current level applied to the printing motor 14. If the print hammer 30 reaches the predetermined deceleration start position Pl, a control is made such that the predetermined inverse current whose current level meets with the current level is applied to the printing motor 14, the offset current level being approximately disproportional to the current level.

With such control, the print hammer 30 undergoes stabilized deceleration, and has a constant speed at a phase immediately before the impacting, so that stabilized printing pressure can be obtained. As a result, printing quality can be improved.

Further, even if load exerted on the printing motor 14 is varied dependent on takeup amount of the printing ribbon, printing pressure can be promptly and suitably controlled by decelerating the print hammer to the predetermined speed through the control to the level of the offset electric current to be applied to the printing motor 14. Accordingly, uniform and stable printing operation is attainable without any print irregularities.

While the invention has been described in detail and with reference to specific embodiment thereof, it would be apparent to those skilled in the art that various changes and modifications may be made without departing from the spirit and scope of the invention. For example, in the above described embodiment, control is made with respect to the inverse current level and offset current applying period. However, only the offset current level can be changed without changing the offset current applying period. Alternatively, only the offset current applying period can be changed with maintaining constant offset current level. Further, if the offset current is applied in a pulse like manner, the deceleration speed of the print hammer 30 can be controlled by controlling duty ratio of the pulse. Moreover, it is possible to control the offset current on a basis of an electrical current level, the current level being measured when flowing through the printing motor 14, instead of the provisional storage of the current level.

As described above, in the present invention, by the detection of level of the electrical current applied to the motor, load exerted on the motor is assumed. On the basis of the load, offset current to be applied to the motor is controlled. Therefore, the motor speed can be promptly and suitably controlled, even if load exerted on the motor is varied.

What is claimed is:

1. A motor control device for controlling rotation speed of a single motor driving a plurality of mechanisms, an electrical current level which is applied to the single motor being changeable in accordance with the operation of one of the mechanisms, the control device comprising:

detection means for detecting an actual rotation speed of the single motor:

storage means for storing a prestored rotation speed value of the single motor;

means for comparing the actual rotation speed of the single motor detected by the detection means with the prestored rotation speed value stored in the storage means;

means for selecting a current level necessary to obtain the prestored rotation speed, the selected current level being substantially proportional to a level of load imparted on the single motor;

means for setting an offset current level and an offset current applying period to obtain said necessary current level on a basis of the level of load; and means for applying said offset current level to said motor for said offset current applying period.

2. The motor control device as claimed in claim 1, wherein the detection means comprises:

an encoder disc coaxially provided with the single motor; and a photosensor for generating a pulse signal indicative of the rotation speed of the motor.

3. The motor control device as claimed in claim 2, wherein the offset current level set in the offset current setting means is substantially disproportional to the level of load.

4. The motor control device as claimed in claim 3, wherein the offset current applying period is substantially disproportional to the level of load.

5. The motor control device as claimed in claim 4, wherein the motor comprises a direct current motor.

6. The motor control device as claimed in claim 5, wherein the plurality of mechanisms comprises:

a print hammer drive mechanism having a print hammer in an electronic typewriter for impacting a character wheel with the print hammer; and a takeup mechanism for taking up an printing ribbon in accordance with a printing operation, the load exerted on the motor being varied depending on a takeup diameter of the printing ribbon.

7. An electronic typewriter comprising: a main frame; the single drive motor fixedly secured to the main frame and having a drive shaft;

a print hammer drive mechanism driven by the single motor, and comprising a printing cam coupled to the drive shaft, lever means pivotally supported to the main frame and having one end in contact with the printing cam and having another end, and a print hammer pivotally supported to the another end of the lever means;

a position shifting mechanism driven by the single motor and having a holder member and an elevation cam for moving the holder member between a printing position and an erase position, the elevation cam coupled to the drive shaft;

a printing ribbon takeup mechanism driven by the single motor and having a printing ribbon for taking up the printing ribbon in accordance with a printing operation, the printing ribbon being mounted on the holder member, the printing ribbon takeup mechanism further comprising a ribbon supply cam coupled to the drive shaft, a pivot member having one end in contact with the ribbon supply cam and another end, and a ribbon feed means rotatably supported to the holder and engageable with the another end of the pivot member an erase ribbon takeup mechanism driven by the single motor and having an erase ribbon mounted on the holder; and means for controlling rotation speed of the single drive motor depending on a level of load imparted on the single drive motor.

8. The electronic typewriter as claimed in claim 7, wherein the controlling means comprises detection means for detecting rotation speed of the single drive motor;

load assumption means for assuming a level of load imparted on the single drive motor on a basis of the rotation speed detected by the detection means; and offset current setting means for setting at least one of offset current level and inverse current applying period on a basis of the load level assumed by the load assumption means.

9. The electronic typewriter as claimed in claim 8, wherein the detection means comprises;

an encoder disc coaxially provided with the drive shaft of the single drive motor; and a photosensor for generating a pulse signal indicative of the rotation speed of the single drive motor 1.

10. The motor control device as claimed in claim 9, wherein the load assumption means comprises;

means for comparing the rotation speed of the single drive motor detected by the detection means with a prestored rotation speed; and means for selecting current level necessary for obtaining the prestored rotation speed, the selected current level being substantially proportional to a level of load imparted on the single drive motor.

11. The motor control device as claimed in claim 10, wherein the offset current level set in the offset current setting means is substantially disproportional to the level of load.

12. The motor control device as claimed in claim 11, wherein the offset current applying period is substantially disproportional to the level of load.

13. The motor control device as claimed in claim 12, wherein the single drive motor comprises a direct current motor.

* * * * *